March 11, 1958           E. R. PRICE           2,826,284

COMBINED BRAKE AND MOTOR CONTROL MECHANISM

Original Filed Sept. 29, 1950           2 Sheets-Sheet 1

INVENTOR.
EARL R. PRICE
BY H. O. Clayton
ATTORNEY

March 11, 1958 E. R. PRICE 2,826,284
COMBINED BRAKE AND MOTOR CONTROL MECHANISM
Original Filed Sept. 29, 1950 2 Sheets-Sheet 2

INVENTOR.
EARL R. PRICE
BY
H. O. Clayton
ATTORNEY

United States Patent Office 2,826,284
Patented Mar. 11, 1958

2,826,284

COMBINED BRAKE AND MOTOR CONTROL MECHANISM

Earl R. Price, South Bend, Ind., assignor to Bendix Aviation Corporation, South Bend, Ind., a corporation of Delaware Original application September 29, 1950, Serial No. 187,465, now Patent No. 2,642,484, dated June 16, 1953. Divided and this application May 26, 1953, Serial No. 357,446

4 Claims. (Cl. 192—3)

This invention relates in general to the brake controlling mechanism of an automotive vehicle and more particularly to an anti-creep brake control incorporated in said mechanism to effect, when the vehicle is either stationary or is moving at or below a certain speed, a holding of the front wheel brakes.

It is desirable to so control the time of operation of an automotive vehicle brake controlling anti-creep mechanism that the two front brakes of the vehicle are, once they are applied, held applied when the accelerator is released and the vehicle is static or when the vehicle is traveling at or below a relatively low speed. It is accordingly an object of my invention to effect this end and this may be done, in an automotive vehicle equipped with an accelerator and hydraulic brakes, by the provision of a simple, compact and easily serviced valve operating vehicle speed responsive means, operative when the vehicle is either at a standstill or is moving at or below a certain speed, to hold the two front brakes of the brake system applied.

A further object of my invention is to provide, in an automotive vehicle including a four-wheel brake mechanism, brake anti-creep means, including a valve or its equivalent, for controlling the operation of two of the wheel brakes of the mechanism preferably the two front brakes; together with means, responsive to the speed of rotation of two of the wheels, preferably the two rear wheels of the vehicle, for controlling said valve.

The above and other objects and features of the invention will appear more fully hereinafter from a consideration of the following description taken in connection with the accompanying drawings where one embodiment of the invention is illustrated by way of example.

Figure 1:
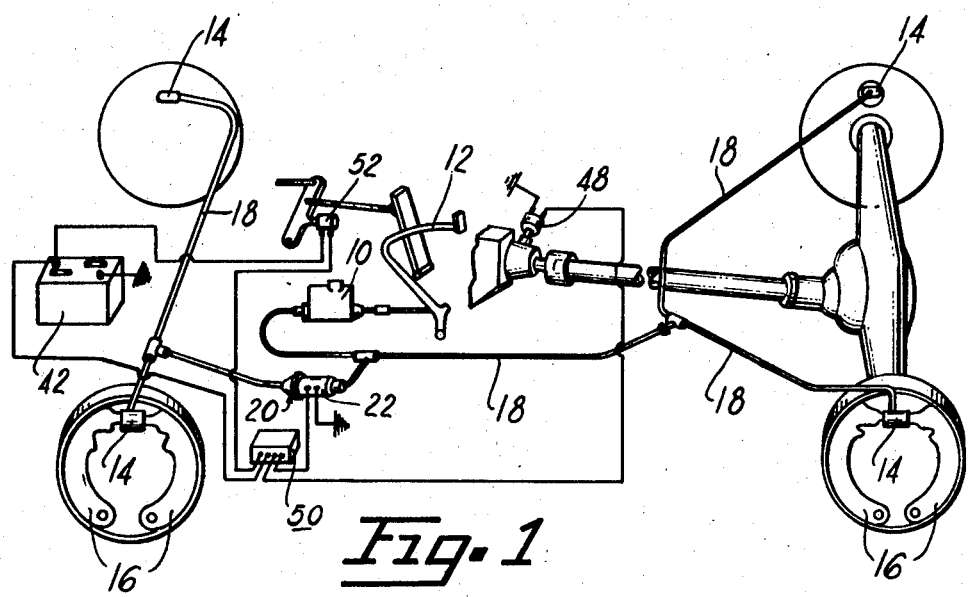
Figure 2:
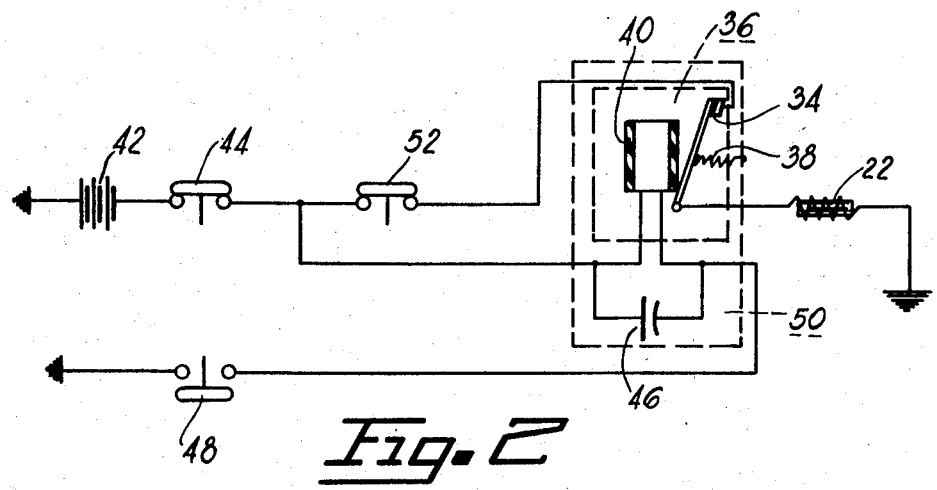
Figure 3:
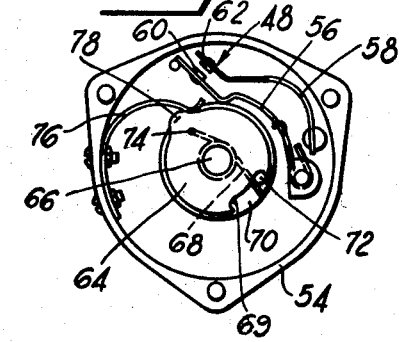
Figure 4:
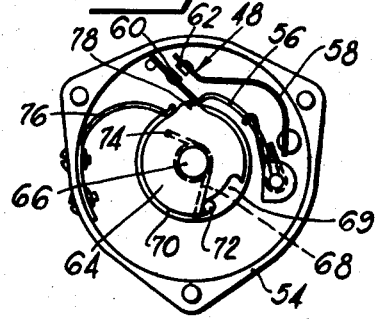
Figure 5:
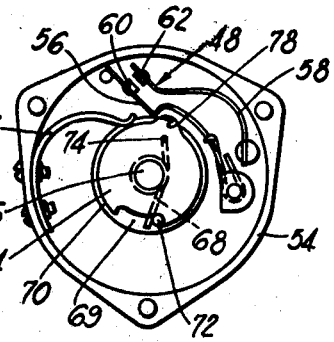
Figure 6:
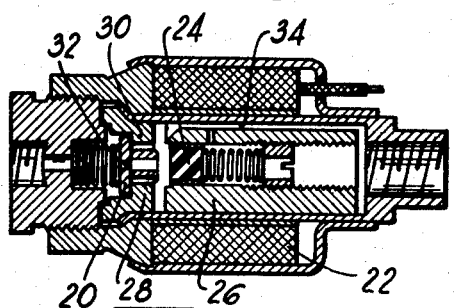

Figure 1 is a diagrammatic view disclosing one embodiment of my invention employed as a part of the anti-creep mechanism of an automotive vehicle;

Figure 2 discloses the electrical hookup of the mechanism of Figure 1;

Figures 3, 4 and 5 disclose details of the speed responsive breaker switch mechanism used in my invention, the switch operating means thereof being shown in several of its operative positions; and Figure 6 is a sectional view disclosing details of the solenoid operated check valve of the mechanism of Figure 1.

There is disclosed in Figures 1 and 2 a preferred embodiment of my invention wherein the switch controlling mechanism of my invention is employed to control a well known type of brake mechanism of an automotive vehicle said mechanism including a well known type of anti-creep mechanism. This brake and anti-creep mechanism of the combination constituting my invention, includes a master cylinder 10 housing a piston, not shown, which is actuated as a result of the manual operation of a brake pedal 12. Depression of the brake pedal to apply the brakes energizes slave cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing the anti-creep mechanism of this well known brake mechanism a solenoid operated check valve 20, Figure 6, preferably inserted in the system to control only the front brakes of the vehicle, operates, with a release of the brake pedal and after the energization of a grounded solenoid 22, to trap the brake fluid between the slave cylinders and said valve, thereby holding the front brakes in their applied position; however, said solenoid when deenergized serves to disable this valve and thereby disable the anti-creep mechanism. Describing the latter operation a spring loaded yieldable member 24, housed within the armature 26 of the solenoid, is spaced from an opening 28 in the pole piece 30 of the solenoid thereby making it possible for the brake fluid to return through an opening 32 in the check valve, the opening 28, and thence through a longitudinally extending recess 34 in the armature 26 and on toward the master cylinder 10.

As one of the features of my invention there is provided an efficient and effective means for controlling the time of operation of a switch mechanism said mechanism controlling, by means including the aforementioned anti-creep mechanism, only the front wheel brakes of the vehicle.

Describing now the switch control means of Figures 1 and 2 there is provided a normally closed switch 34 of a relay 36; and this switch is preferably biased to its closed position by a spring 38. The coil 40 of the relay is electrically connected in series with a grounded battery 42, the ignition switch 44 of the vehicle and a grounded vehicle speed responsive breaker switch 48 which is opened when the car is brought to a stop. No claim is made to the latter switch inasmuch as the same is the invention of James K. Tom and is disclosed in his U. S. application for patent, Serial No. 202,714, filed December 26, 1950, now Patent No. 2,689,892. A feature of my invention lies in the provision of a condenser 46 which is electrically connected in parallel with the relay coil 40 in the aforementioned electrical circuit including the battery, the ignition switch and the breaker switch. The relay 36 and condenser 46 may be housed within one container indicated by the reference numeral 50 in Figures 1 and 2.

The parts of the mechanism of Figure 1, particularly the condenser 46 and the rate of charge thereof, are preferably so constructed and arranged and so operative that the anti-creep mechanism is rendered operative at the beginning of a certain period of time before the vehicle comes to a stop; or the parts of the mechanism may be constructed and arranged and operative to effect an operation of the anti-creep mechanism at the end of a certain period of time after the vehicle comes to a stop. An inspection of the electrical hookup of Figure 2 and an inspection of the switch mechanism 48 of Figures 3, 4 and 5 reveals the operation of the mechanism to effect either one of these results inasmuch as the condenser 46 is electrically connected in parallel with the relay coil 40. As to the four-wheel brake mechanism of Figure 1, it is to be particularly noted that the anti-creep portion of this mechanism is operative to control only the two front wheel brakes and that the means for controlling the anti-creep mechanism, including the condenser 46, is responsive to the speed of rotation of the two rear wheels of the vehicle.

The remainder of the electrical circuit for controlling the operation of the solenoid 22 of the anti-creep mechanism includes, in series with the solenoid, the normally closed relay switch 34, an accelerator operated breaker switch 52, the ignition switch 44, and the grounded battery 42. The accelerator operated breaker switch 52 is not disclosed in detail inasmuch as no claims are made thereto the same being of any of the well known designs of such a switch. This switch 52 is closed when the accelerator is in its released position.

Describing now the speed responsive breaker switch 48 disclosed in Figures 3, 4 and 5 this switch includes a casing 54 to which are secured flexible switch contact arms 56 and 58, switch contacts 60 and 62 being mounted on the ends of said arms respectively. A disc shaped switch operating cam member 64 is rotatably mounted on a switch drive shaft 66—the two being yieldably connected by means of a torque spring 68 sleeved over the shaft and lying between the cam 64 and a flange 70 fixedly connected to the shaft. One end of the spring 68 abuts a drive pin 72 which extends laterally from the face of the flange 70 and within a recess 69 in the cam; and the other end of the spring extends within an opening 74 in the cam. The torque spring serves to rotate the cam in the same direction as the switch drive shaft normally rotates; and a leaf spring 76 of sufficient tension is mounted on the switch casing and serves to arrest the movement of the cam once per revolution while the drive shaft continues its rotation, and its operation of loading the torque spring. As the drive shaft overruns the cam, say one-eighth turn to the position disclosed in Figure 4, said shaft and cam rotate as one and force a cam lug 78 past the leaf spring. Immediately thereafter the torque spring causes the cam to overrun the drive shaft one-eighth turn to its original and normal position the parts being then in the position disclosed in Figure 5. During the overrun operation the cam lug 78 serves to move the flexible switch arm 56 toward the arm 58 thereby closing the switch contacts 60 and 62 momentarily. The switch arm 56 is so placed that even though the drive shaft should stop its movement simultaneously with release of the cam lug from the leaf spring 76, said lug will nevertheless ride past the switch arm and will never hold the switch contacts closed for more than an instant. The breaker switch operating drive shaft 66 is preferably drivably connected to the speedometer cable of the vehicle and the parts of the mechanism are preferably so constructed and arranged that the relay 36 is energized and deenergized and the condenser 46 is charged approximately 1,000 times per mile of travel of the vehicle.

The breaker switch 48 is therefore connected to the speedometer of the vehicle which is of course connected to the rear wheels of the vehicle in order to accurately indicate the vehicle speed; accordingly the driver of the vehicle will, with the mechanism of my invention, know when he is above the speed at which the anti-creep mechanism will come into operation. By suitable sizing of the condenser 46 and solenoid 40 the speed at which the anti-creep mechanism comes into operation can be made to occur at any predetermined low speed or even a short time after the vehicle comes to a standstill. Thereafter if the brakes are applied, solenoid 22 causes a predetermined pressure to be trapped in the front wheel brake applying cylinders which pressure will be sufficient to prevent creep of the vehicle.

Describing now in brief an operation of the embodiment of my invention disclosed in Figures 1 and 2 the front wheel anti-creep mechanism is rendered inoperative so long as the car is in motion above a certain critical speed; this for the reason that the relay switch 34 is held open by an operation of the breaker switch and the condenser thereby rendering the check valve 20 inoperative to trap the brake fluid in the slave cylinders. When the accelerator pedal is released, and the speed of the vehicle decreases below the value at which flow of current from condenser 46 through the solenoid 40 is just large enough to hold switch 34 open against the force of spring 38, the switch 34 will be closed by spring 38 to effect energization of the solenoid 22. Thereafter pressure is held against the front wheel cylinders 14 when the brakes are applied, to prevent subsequent movement of the vehicle until such time as the operator depresses the accelerator pedal again. By proper sizing of the solenoid 40 and condenser 46, the critical current flow rate through solenoid 40, below which the solenoid can no longer hold switch 34 open, can be made to occur either prior to or just after the time at which the vehicle comes to a standstill.

There is thus provided, by the control mechanism of my invention, an effective inexpensive means for holding the front wheel brakes of an automotive vehicle applied at the time most desired, that is, when the vehicle is either at a standstill or is traveling at a relatively low speed.

This application constitutes a division of my application No. 187,465, filed September 29, 1950, now Patent No. 2,642,484, issued June 16, 1953.

I claim:

1. In a braking system for a motor driven device; a control member having a normal position for causing said motor to accelerate the driven device when said control member is moved out of its normal position; a brake applying fluid pressure motor, a pressurizing device for actuating said fluid pressure motor, a solenoid operated valve positioned between said fluid pressure motor and said pressurizing device, an electrical switch for controlling said solenoid operated valve, said switch and valve being so constructed and arranged to retain fluid pressure existing in said fluid pressure motor when said switch is in one position and to relieve fluid pressure in said fluid pressure motor when in a second position, a second solenoid for moving said switch from said one position to said second position when a current flow above a generally predetermined rate passes through said second solenoid, a condenser connected in direct parallel electrical circuit with respect to said second solenoid, switch means in series electrical circuit with respect to said condenser and normally open with respect thereto for simultaneously charging said condenser at a frequency generally proportional to the speed of the driven device, and which means presents an open circuit with respect to said solenoid when motion of the driven device stops, said second solenoid, condenser and last mentioned means being constructed and arranged such that said first mentioned switch will be held in said one position below a generally predetermined speed of said driven device, and will be held in said second position at or above said generally predetermined speed of the driven device, and a release switch in the electrical supply circuit for said solenoid operated valve constructed and arranged to cause said valve to open when said control member is moved out of its normal position to cause said driven device to accelerate.

2. In a braking system for a motor driven device; a control member having a normal position for causing said motor to accelerate the driven device when said control member is moved out of its normal position; a brake applying fluid pressure motor, a master cylinder connected to said fluid pressure motor, a solenoid operated valve positioned between said fluid pressure motor and said master cylinder, said valve being constructed and arranged to hold brake applying fluid pressure on said fluid pressure motor when its solenoid is energized, normally closed switch means in electrical series circuit with said solenoid, a second solenoid operatively connected to said switch means for opening said switch means when a predetermined electrical flow is experienced through said second solenoid, a condenser in direct parallel electrical circuit with respect to said second solenoid, a normally open switch in series electrical circuit with respect to said condenser, said switch being constructed and arranged to snap closed and then immediately open at a frequency generally proportional to the speed of the driven device, and to remain open when motion of the driven device stops, and a release switch in the electrical supply circuit for said solenoid operated valve, said switch being normally closed and being constructed and arranged to be opened when said control member is moved out of its normal position, whereby simple, inexpensive, and generally foolproof means are provided to actuate said solenoid valve at or below generally predetermined speeds of said driven device, and thereby permit the brake to be held applied.

3. In a braking system for a motor driven movable device: a brake for restraining movement of said device; means for applying said brake; an electrical solenoid for holding the brake in its applied condition when said solenoid is energized and the brake has been applied; an electrical supply circuit for said solenoid; a normally closed switch in said electrical supply circuit; a second solenoid operatively connected to said switch means for opening said switch when a predetermined electrical flow is experienced through said second solenoid; a condenser in direct parallel electrical circuit with respect to said second solenoid; switch means in series electrical supply circuit with respect to said condenser and normally open with respect thereto for instantaneously charging said condenser at a frequency generally proportional to the speed of said movable device, and which means presents an open circuit with respect to said solenoid when movement of said movable device ceases, said second solenoid, condenser and last mentioned means being constructed and arranged such that said first mentioned switch will remain closed below a generally predetermined speed of the movable device, and will be opened at speeds above said generally predetermined rate; a motor control member for said movable device, said motor control member having a normal position out of which it is moved to speed up said movable device; and a normally closed switch in said electrical supply circuit for said first mentioned solenoid, which switch is opened when said motor control member is moved out of its normal position.

4. In a braking system for a motor driven movable device: a brake for restraining movement of said device; means for applying said brake; an electrical solenoid for holding the brake in its applied condition when said solenoid is energized and the brake has been applied; an electrical supply circuit for said solenoid; a normally closed switch in said electrical supply circuit; a second solenoid operatively connected to said switch means for opening said switch when a predetermined electrical flow is experienced through said second solenoid; a condenser in direct parallel electrical circuit with respect to said second solenoid; a normally open switch in series electrical circuit with respect to said condenser, said switch being constructed and arranged to snap closed and then immediately open at a frequency generally proportional to the speed of said movable device, and to remain open when movement of the movable device ceases, said second solenoid, condenser and switch being constructed and arranged such that said first mentioned switch will remain closed below a generally predetermined speed of the movable device, and will be opened at speeds above said generally predetermined rate; a motor control member for said movable device, said motor control member having a normal position out of which it is moved to speed up said movable device; and a normally closed switch in said electrical supply circuit for said first mentioned solenoid, which switch is opened when said motor control member is moved out of its normal position.

References Cited in the file of this patent

UNITED STATES PATENTS

| | | |
|---|---|---|
| 2,313,430 | Goepfrich | Mar. 9, 1943 |
| 2,381,250 | Bauman | Aug. 7, 1945 |
| 2,530,749 | Yardeny et al. | Nov. 21, 1950 |
| 2,573,196 | Harmon | Oct. 30, 1951 |
| 2,583,485 | Harmon et al. | Jan. 22, 1952 |
| 2,630,196 | Weiss et al. | Mar. 3, 1953 |
| 2,642,484 | Price | June 16, 1953 |
| 2,724,451 | Prather | Nov. 22, 1955 |

U. S. DEPARTMENT OF COMMERCE
PATENT OFFICE

CERTIFICATE OF CORRECTION

Patent No. 2,826,284     Earl R. Price     March 11, 1958

It is hereby certified that error appears in the printed specification of the above numbered patent requiring correction and that the said Letters Patent should read as corrected below.

Column 4, lines 43 and 44, for "simultaneously" read -- instantaneously --.

Signed and sealed this 1st day of July 1958.

(SEAL)
Attest:
KARL H. AXLINE
Attesting Officer

ROBERT C. WATSON
Commissioner of Patents